(12) United States Patent
Rahmat et al.

(10) Patent No.: US 7,366,997 B1
(45) Date of Patent: Apr. 29, 2008

(54) METHODS AND APPARATUSES FOR THERMAL ANALYSIS BASED CIRCUIT DESIGN

(75) Inventors: Khalid Rahmat, Fremont, CA (US); Kenneth S. McElvain, Los Altos, CA (US)

(73) Assignee: Synplicity, Inc., Sunnyvale, CA (US)

( * ) Notice: Subject to any disclaimer, the term of this patent is extended or adjusted under 35 U.S.C. 154(b) by 449 days.

(21) Appl. No.: 11/034,391

(22) Filed: Jan. 11, 2005

(51) Int. Cl.
  *G06F 17/50* (2006.01)
(52) U.S. Cl. .................... 716/1; 716/9; 716/12
(58) Field of Classification Search ............ 716/1, 716/2, 9, 12
  See application file for complete search history.

(56) References Cited

U.S. PATENT DOCUMENTS 5,682,320 A * 10/1997 Khouja et al. ............... 716/4

OTHER PUBLICATIONS

Kaustav Banerjee, et al. "Analysis and Optimization of Thermal Issues in High-Performance VLSI". Apr. 2001. pp. 230-237. Sonoma, California.
Kyoung Keun Lee, et al. "Thermal-driven Circuit Partitioning and Floorplanning with Power Optimization". School of Electrical and Computer Engineering.
Guoqiang Chen, et al. "Partition-Driven Standard Cell Thermal Placement". Apr. 2003. pp. 75-80. Monterey, California.
Farid N. Najm. "A Survey of Power Estimation Techniques in VLSI Circuits". IEEE Trans. on VLSI, Dec. 1994. pp. 1-21.
Shamik Das, et al. "Timing, Energy, and Thermal Performance of Three-Dimensional Integrated Circuits". Apr. 2004. Boston, Massachusetts.
Osman S. Unsal, et al. "System-Level Power-Aware Design Techniques in Real-Time Systems". Proceedings of the IEEE, vol. 91, No. 7, Jul. 2003.
Kaushik Roy, et al. "Leakage Current Mechanisms and Leakage Reduction Techniques in Deep-Submicrometer CMOS Circuits". Proceedings of the IEEE, vol. 91, No. 2, Feb. 2003.
Pillage, L. T., et al., "Electronic Circuit of System Simulation Methods", pp. 200-204. Chaper 7.6 Sparse Tableau Analysis.
Tsai, Ching-Han, et al. "Standard Cell Placement for Even On-Chip Thermal Distribution", 6 pages. University of Illinois at Urbana-Champaign, Department of Electrical and Computer Engineering, Coordinated Science Laboratory.

* cited by examiner

*Primary Examiner*—Thuan Do
(74) *Attorney, Agent, or Firm*—Blakely, Sokoloff, Taylor & Zafman LLP

(57) ABSTRACT

Methods and apparatuses for circuit design to reduce power usage, such as reducing temperature dependent power usage, and/or to improve timing, such as reducing temperature dependent delay or transition time. At least one embodiment of the present invention reduces the power dissipation and improves the timing of an integrated circuit to optimize the design. A thermal analysis is used to determine the temperature dependent power dissipation of a circuit and the temperature distribution of the circuit resulting from dissipating the heat created by the temperature dependent power dissipation. Then, the components of the design are selectively transformed to reduce the power dissipation and to improve timing based on the temperature solution. The transformation may include placement changes and netlist changes, such as the change of transistor threshold voltages for cells or for blocks of the circuit chip.

33 Claims, 9 Drawing Sheets

METHODS AND APPARATUSES FOR THERMAL ANALYSIS BASED CIRCUIT DESIGN

FIELD OF THE TECHNOLOGY

The invention relates to automated circuit design, and more particularly to the automated transformation and optimization of a design of a circuit for improved timing and reduced power.

BACKGROUND

For the design of digital circuits (e.g., on the scale of Very Large Scale Integration (VLSI) technology), designers often employ computer-aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning." A typical floor planning operation divides the circuit area of an integrated circuit into regions, sometimes called "blocks", and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and routing typically runs faster because as it has been reduced from one very large problem into a series of simpler problems.

A typical integrated circuit is designed for implementation on a chip substrate. For example, a silicon substrate can have devices, such as standard cells, custom blocks, etc., formed on the substrate and interconnected by layers of metal which are separated by layers of dielectric materials.

A silicon chip dissipates power during operation. The temperature of the silicon chip rises while the heat generated from the power used by the circuit is being conducted away to the surrounding environment. The silicon substrate conducts away a portion of the heat, while the metal interconnect stack above the silicon substrate used for signal interconnect and power distribution conducts away a portion of the heat.

When the chip reaches a steady state for heat dissipation, at an elevated silicon temperature field equilibrium exists between the heat generated and the heat transported away by the temperature gradient created by the difference between the silicon temperature and the ambient temperature. The silicon temperature field is typically non-uniform. The temperature in the silicon chip typically varies according to the locations, depending on the local heat generation and the physical layout of the chip.

High temperature in an Integrated Circuit (IC) chip may reduce the reliability of the IC chip. Large temperature gradient in the chip may cause malfunction. For example, K. Banerjee, M. Pedram and A. H. Ajami (2001), "Analysis and optimization of thermal issues in high-performance VLSI," Proc. of 2001 International Symposium on Physical Design (ISPD), provide an overview of various thermal issues in high-performance VLSI with especial attention to their implications for performance and reliability.

Some techniques have been developed to consider the steady state of the thermal conduction during the process of partitioning and placement. Examples of such techniques include: C. H. Tsai and S-M Kang (1999), "Standard Cell Placement for even on-chip thermal distribution," Proc. of 1999 International Symposium on Physical Design (ISPD); Guoqiang Chen and Sachin Sapatnekar (2003), "Partition-Driven Standard Cell Thermal Placement," Proc. of 2003 International Symposium on Physical Design (ISPD); Kyoung Keun Lee, Edward J. Paradise, Sung Kyu Lim (2003), "Thermal-driven Circuit partitioning and Floorplanning with Power Optimization," Georgia Institute of Technology, Center for Experimental Research in Computer Systems, Technical Reports, GIT-CERCS-03-07. These techniques seek for an even temperature distribution in a partitioning and placement process during the early stage of a circuit design (e.g., floorplanning to breaking down a circuit design into blocks and lay out the blocks).

Some techniques for design optimization include three-dimensional integration. For example, S. Das, A. Chandrakasan and Rafael Reif (2004), "Timing, energy and thermal performance of three-dimensional integrated circuits," Proc. of Great Lakes Symposium on VLSI (GL VLSI), show a method of combining multiple device layers with a high-density inter-layer interconnect for 3-D integration of a given circuit to provide better timing and energy performance relative to a single wafer implementation of the same circuit.

SUMMARY OF THE DESCRIPTION

Methods and apparatuses for circuit design to reduce power usage, such as reducing temperature dependent power usage, and/or to improve timing, such as reducing temperature dependent delay or transition time, are described here. Some embodiments of the present invention are summarized in this section.

At least one embodiment of the present invention reduces the power dissipation and improves the timing of an integrated circuit to optimize the design. A thermal analysis is used to determine the temperature dependent power dissipation of a circuit and the temperature distribution of the circuit resulting from dissipating the heat created by the temperature dependent power dissipation. Based on the temperature solution, the components of the design are selectively transformed to reduce the power dissipation and to improve timing. The transformation may include placement changes and netlist changes, such as the change of transistor threshold voltages for standard cells or for blocks of the circuit chip.

In one aspect of the present invention, a method implemented on a data processing system for circuit design, includes: determining for a first design of a circuit a first temperature solution and a first power dissipation solution, where the first power dissipation solution and the first temperature solution are interdependent; and, transforming the first design of the circuit into a second design of the circuit using the first temperature solution to reduce power dissipation of the circuit under one or more design constraints.

In one example of an embodiment, the first temperature solution is computed to represent a steady state thermal dynamic balance between the first design of the circuit and a surround environment of the circuit. The first power dissipation solution includes temperature dependent power dissipation of elements of the first design. The temperature dependent power dissipation includes leakage power of elements of the first design.

For example, the transformation may include: moving an element of the first design of the circuit from a first location which has a first temperature according to the first temperature solution to a second location which has a second temperature according to the first temperature solution, in which the first temperature is higher than the second temperature.

In one example of an embodiment, the first design includes a placement solution and a routing solution. In one example, the transformation reduces leakage power of the circuit under the one or more design constraints, such as a timing constraint.

In one example of an embodiment, the transformation includes replacing a first element of the first design of the circuit with a second element of the second design of the circuit. The first and second elements are functionally equivalent. The second element has power dissipation lower than the first element at a same temperature. In one example, the first element has a first transistor threshold voltage; the second element has a second transistor threshold voltage; and the first transistor threshold voltage is lower than the second transistor threshold voltage. In one example, the second element is smaller than the first element.

In one example of an embodiment, the transformation includes: replacing a third element of the first design of the circuit with a fourth element of the second design of the circuit to meet a timing requirement on a path passing through the first and third elements. The third and fourth elements are functionally equivalent. The fourth element has power dissipation higher than the third element at a same temperature. In one example, the third element has a third transistor threshold voltage; the fourth element has a fourth transistor threshold voltage; and the fourth transistor threshold voltage is lower than the third transistor threshold voltage.

In one example of an embodiment, the first and third elements are selected on a signal path of the first design of the circuit; the first element is at a first location which has a first temperature according to the first temperature solution; the third element is at a second location which has a second temperature according to the first temperature solution; and the first temperature is higher than the second temperature.

In one example of an embodiment, the method further includes: determining a timing critical path; and selecting a first element of the timing critical path based on at least the first temperature solution; and the transformation includes replacing the first element with a second element to improve timing on the timing critical path. In one example, the first element is selected from a low temperature portion of the timing critical path; and the second element has a transistor threshold voltage lower than the first element.

In one aspect of the present invention, a method implemented on a data processing system for circuit design, includes: determining a temperature solution and a power dissipation solution for a first design of a circuit; and transforming the first design of the circuit into a second design of the circuit using the temperature solution to improve performance of first design of the circuit. The power dissipation solution and the temperature solution are interdependent; and the power dissipation solution and the temperature solution are consistent with each other In one example of an embodiment, the method further includes: selecting an element of the first design from a location with an elevated temperature according to the temperature solution. The first design is transformed into a second design through replacing a first implementation of the element with a second implementation to reduce leakage power. In one example, the first implementation has a transistor threshold voltage lower than the second implementation. In one example, the method further includes: selecting an element of the first design from a location with a low temperature according to the temperature solution. The first design is transformed into a second design through replacing a first implementation of the element with a second implementation to improve timing on a path while limiting an increase in leakage power. In one example, the second implementation has a transistor threshold voltage lower than the first implementation.

In one aspect of the present invention, a method implemented on a data processing system for circuit design, includes: determining a temperature solution and a power dissipation solution for a first design of a circuit, where the power dissipation solution and the temperature solution are interdependent and consistent with each other; and performing timing optimization using the temperature solution to generate a second design of the circuit. In one example, the method further includes: evaluating a temperature dependent delay from an input of an element to an output of the element. In another example, the method further includes: evaluating a temperature dependent transition time of an element at an output of the element. The element, for example, can be a standard cell; a custom block; or a custom macro.

In one example of an embodiment, the first design of the circuit includes a technology dependent netlist in a Hardware Description Language (HDL). In one example, the timing optimization is performed together with power optimization. In one example, the timing optimization includes netlist changes such as changing a transistor threshold value for a cell instance or a block.

In one aspect of the present invention, a method implemented on a data processing system for circuit design, includes: selectively changing transistor threshold value for at least a portion of a design of a circuit to optimize power usage under timing constraint. In one example, the transistor threshold value is selectively changed for individual cell instances. In another example, the transistor threshold value is selectively changed for blocks of a chip. In one example, selection of the portion of the design is at least partially dependent on a temperature solution for the design of the circuit; the temperature solution is based on heat transfer according to a temperature dependent power dissipation solution for the design of the circuit. In one example, the method further includes: determining the temperature solution and the temperature dependent power dissipation solution, which are interdependent and consistent with each other.

The present invention includes methods and apparatuses which perform these methods, including data processing systems which perform these methods, computer readable media which when executed on data processing systems cause the systems to perform these methods, circuits designed using these methods, and computer readable media which contains the data representation of the circuits designed using these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention reduces the power dissipation and improves the timing of an integrated circuit to optimize the design. After computing the power dissipation in an original design, the temperature across the chip due to the heat generated is computed. Then, the components of the design are selectively transformed to reduce the power dissipation and to improve timing based on the temperature solution. For example, cells with high power dissipation and/or larger temperature dependent portion of delays can be moved away from high temperature regions into low temperature regions to reduce the overall power dissipation and/or improve timing.

In one embodiment of the present invention, the power dissipation, temperature and the design (e.g., placement and netlist) are interdependent. Transforming the design causes the changes in the power dissipation distribution which changes the temperature distribution, where the power dissipation distribution depends on the temperature distribution.

In one embodiment of the present invention, a thermal analysis is used to minimize the sources of power that are most directly affected by temperature: leakage power and cell switching power. Significant reduction in power can be achieved without over-constraining the design which may lead to difficultly in meeting the timing requirements.

In one embodiment of the present invention, explicit models for the temperature variation of the power and/or delay are used for the thermal analysis based optimization.

In one embodiment of the present invention, both power and timing are optimized simultaneously based on the thermal analysis.

Figure 1:
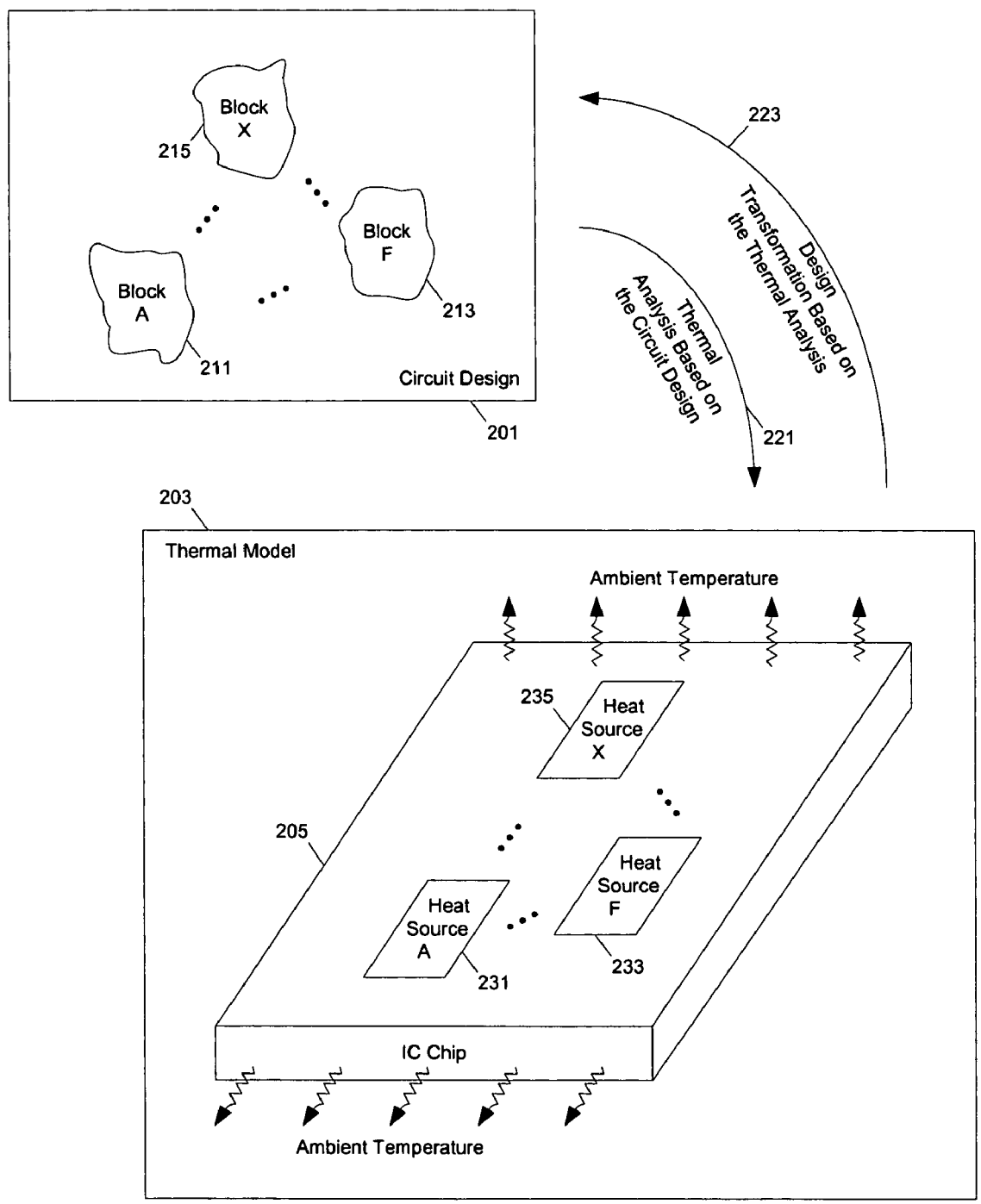
FIG. 1 illustrates a circuit design process for the optimization of power dissipation and timing according to one embodiment of the present invention.

FIG. 1 illustrates a circuit design process for the optimization of power dissipation and timing according to one embodiment of the present invention. In FIG. 1, a circuit design (201) is transformed to improve the performance of the circuit using a thermal model (203) of the circuit design (201). For example, the circuit design may be transformed for reduced power dissipation and/or improved timing. Improving timing performance on critical paths can lead to a reduced clock period so that the circuit can run at a high frequency.

In one embodiment of the present invention, the thermal model (203) represents the steady state of the heat transfer between the chip implementing the circuit design (201) and the surrounding environment (e.g., ambient temperature). The circuit design (201) includes blocks (e.g., 211, 213, 215, . . . ), which consume power when in operation. The consumed power of the circuit blocks, such as standard cells, custom designed blocks, or blocks of cells, are represented as the heat sources (e.g., 231, 233, 235, . . . ) in the thermal model.

According to one embodiment of the present invention, a thermal analysis (221) is performed based on the circuit design (201) to determine the self consistent power dissipation and temperature solution. At least one design transformation (223) is then performed based on the thermal analysis. For example, the design transformation (223) can include a synthesis transformation to replace one or more blocks with one or more functionally equivalent corresponding blocks to optimize a design goal. For example, the block may be transformed to reduce the leakage power, to improve timing performance, etc.

Figure 2:
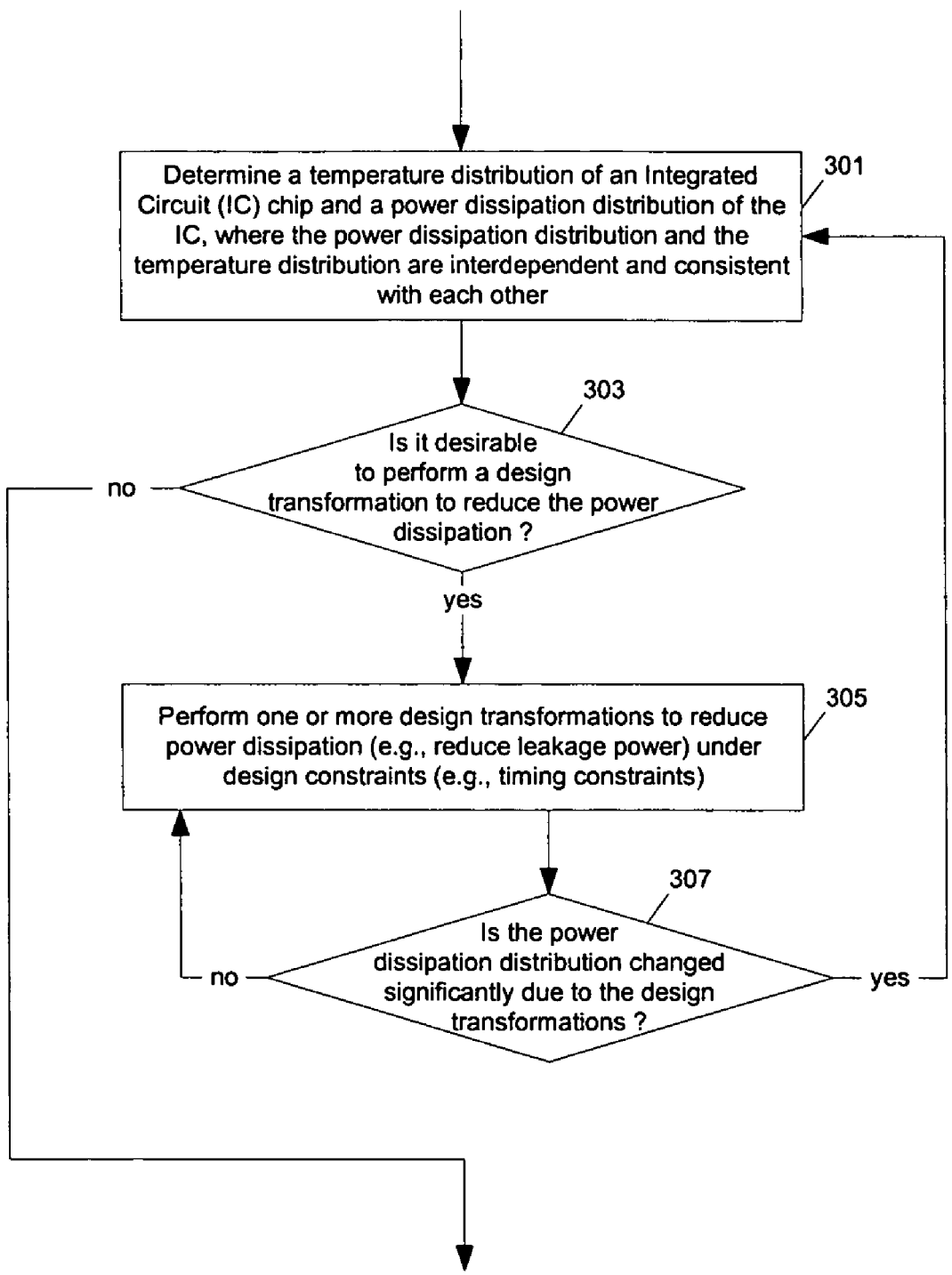
FIG. 2 illustrates a method to optimize a circuit design according to one embodiment of the present invention.

FIG. 2 illustrates a method to optimize a circuit design according to one embodiment of the present invention. Operation 301 determines a temperature distribution of an Integrated Circuit (IC) chip and a power dissipation distribution of the IC, where the power dissipation distribution and the temperature distribution are interdependent and consistent with each other. If operation 303 determines that it is desirable to perform a design transformation to reduce the power dissipation, operation 305 performs one or more design transformations to reduce power dissipation (e.g., reduce leakage power) under design constraints (e.g., timing constraints). Operation 307 determines whether the power dissipation distribution is changed significantly due to the design transformations. If the power dissipation distribution has not been changed significantly, the temperature solution can be further used to perform the design transformation; otherwise, operation 301 is performed to update the temperature solution and the power dissipation distribution. Operations 301-307 can be repeated until a desired design goal is achieved (e.g., the power usage is under a given limit or there is no significant improvement).

Typically, the power dissipation of an Integrated Circuit (IC) chip changes as the computation task performed by the IC chip changes. A number of techniques have been published for the estimation of power dissipation in a chip to resolve the uncertainty (or time dependency) in the computation tasks. See, for example, F. Najm (1994), "A survey of power estimation techniques in VLSI circuits," IEEE Transactions on VLSI Systems, Vol. 2, No. 4, pp. 446-455. Some of the techniques use probabilistic methods; and some of the techniques use a more deterministic approach by applying input vectors and running logic simulations to obtain a large set of switching activities and to estimate the average switching at cell output. These techniques typically generate a form of average computation tasks for the determination of the computation dependent part of the power dissipation for the cell instances.

For the design purpose, the power dissipation estimated for the circuit blocks is typically based on a form of average computation activities. The exact power usages in the circuit blocks are typically based on the computation tasks of the circuit, which typically varies over the time in real world usage. An estimation of the computation activities can then be used to determine the power dissipation for various blocks of the circuit design. For example, the computation activities can be estimated in terms of frequency of switching activities, probabilities of state switching, or combinations of different input vectors, etc. which typically lead to an estimation of a form of average power dissipation due to computation activities over time.

In general, when the time dependent aspect of the power dissipation and temperature variation is not of particular interest during the design process, a form of power dissipation averaged over time can be used to obtain a "typical" temperature distribution. Further, a steady state of the heat dissipation can be used to obtain a "typical" temperature distribution and remove the time varying aspect of the heat dissipation process.

Thus, in one embodiment, a form of the computation activity usage of the circuit blocks is used to remove the time varying aspect of the computation activities; and a steady state solution for the thermal model is use to remove the time varying aspect of the time varying aspect of the heat transfer process. The power dissipation solution and the temperature field solution may or may not be exactly equal to a real world power dissipation distribution and a real world temperature field for an implementation of the circuit design.

Thus, the temperature field solution to the thermal model (205) represents a time independent aspect of the temperature field of the circuit design implemented as an Integrated Circuit (IC) chip. An IC chip is typically made of a silicon substrate with metal layers for interconnect and other materials, such as dielectric materials that separates the metal layers and package materials which protect the IC chip.

In one embodiment of the present invention, the power dissipations of the circuit blocks (e.g., 211, 213, 215) are based on not only the computation activities but also the temperature of the circuit blocks. Thus, the temperature solution and the power dissipation solution are interdependent. In one embodiment, the power dissipations of the circuit blocks include a temperature dependent portion, which is optimized using the temperature solution obtained from the thermal model (203) based on the temperature dependent power dissipation solution.

In one embodiment of the present invention, the temperature dependent power dissipation solution and the temperature solution based on the power dissipation solution are consistent with each other. In one aspect, the temperature field used to determine the power dissipation solution is consistent with the temperature solution obtained from solving the heat dissipation problem according to the determined power dissipation solution. In another aspect, the power dissipation used to determine a temperature solution is consistent with the power dissipation solution computed according to the temperature solution.

Figure 3:
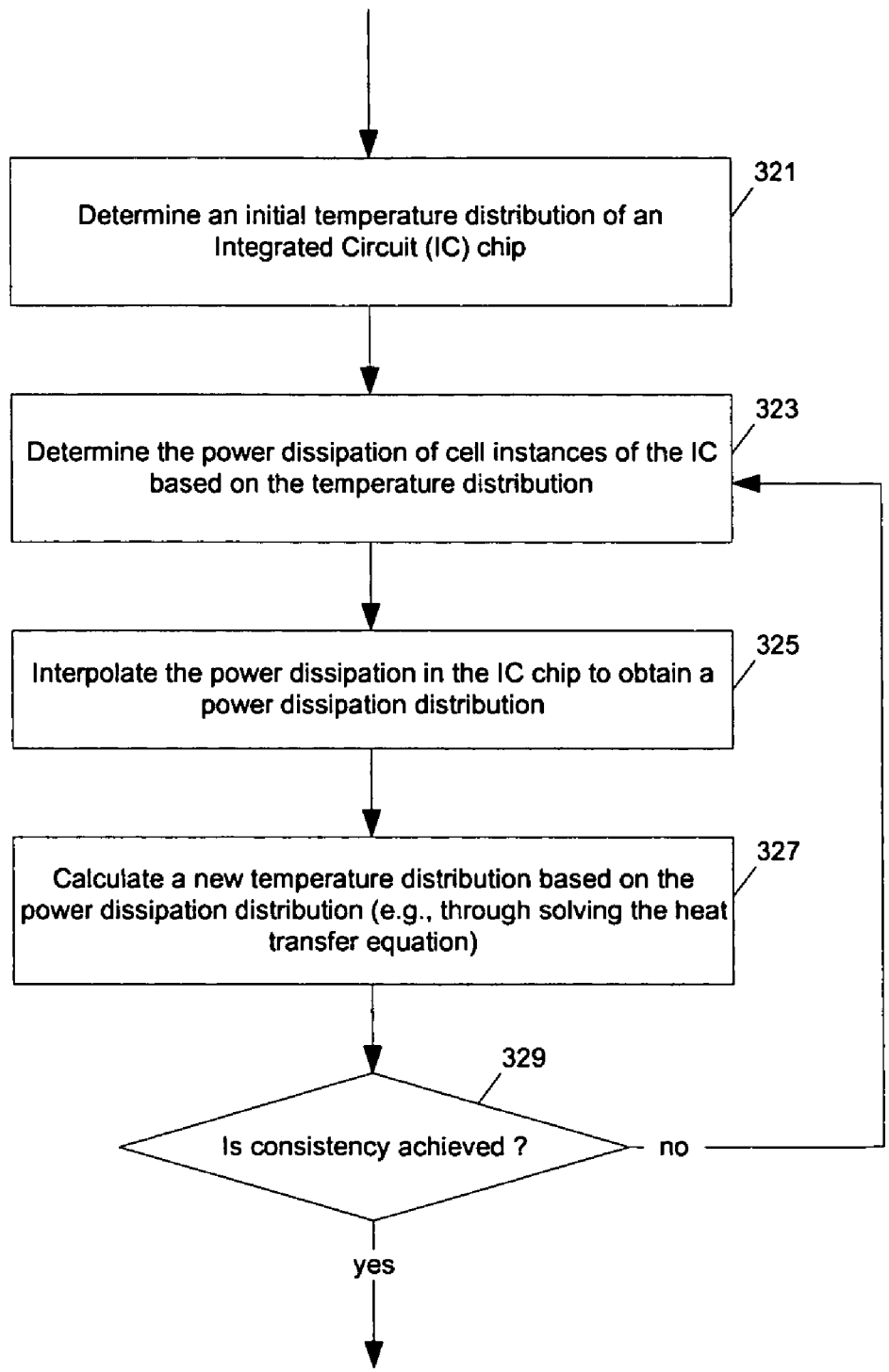
FIG. 3 illustrates a method to obtain a self-consistent thermal field for the optimization process according to one embodiment of the present invention.

FIG. 3 illustrates a method to obtain a self-consistent thermal field for the optimization process according to one embodiment of the present invention. After operation 321 determines an initial temperature distribution of an Integrated Circuit (IC) chip, operation 323 determines the power dissipation of cell instances of the IC based on the temperature distribution. The initial temperature distribution may be a uniform temperature field at the ambient temperature or other predicted temperatures.

Operation 325 interpolates the power dissipation in the IC chip to obtain a power dissipation distribution. Typically, the thermal model of the continuum media for heat transfer (e.g., in the form of a Laplace's equation) is discretized using a numerical scheme, such as a finite difference method, a finite element method, a boundary element method, etc. Some of the numerical methods may not require the explicit interpolation of the power dissipations, since the power dissipation of the cell instances can be directly used.

Operation 327 calculates a new temperature distribution based on the power dissipation distribution (e.g., through solving the heat transfer equation using a numerical scheme). Operation 329 determines whether consistency is achieved. If the new temperate distribution is consistent with the previous temperate used to determine the power dissipation distribution of the thermal model (or the power dissipation distribution computed using the new temperature distribution is consistent with the previous iteration of the power dissipation distribution), consistency is achieved. Otherwise, operations 323-329 can be repeated until consistency is achieved.

In one embodiment of the present invention, the power dissipation in integrated circuits includes three major components: net switching power ($P_{net}$), cell switching power ($P_{switching}$) and cell leakage power ($P_{leakage}$), where the cell may be a standard cell or a larger custom designed block whose behavior is understood. The switching power is the power dissipated for signal/state switching in the net or in the cell. The cell leakage power is due to the leakage current, which can arise from reverse bias diode currents and sub-threshold effects. A detailed discussion on leakage current can be found in K. Roy, S. Mukhopadhyay, H. Mahmoodi-Meimand (2003), "Leakage current mechanisms and leakage reduction techniques in deep-submicrometer CMOS circuits," Proceedings of the IEEE, Vol. 91, No. 2, pp. 305-327.

The net switching power typically does not depend on the silicon temperature of the silicon, because it is primarily controlled by the load capacitance (wire or gate capacitance) and the supply voltage. The cell switching power and the leakage power typically increase with silicon temperature. When the temperature increases, the leakage power typically increases more rapidly than the cell switching power. The cell switching power typically increases linearly (or according to a polynomial function) with respect to the temperature. The leakage power typically is an exponential function of the silicon temperature.

In one embodiment of the present invention, the temperature variation of power dissipation is modeled based on the physical phenomenon it represents. In one implementation, $P_{net}$ is independent of the temperature; $P_{switching}$ is a slowly increasing function of the temperature, such as $P_0 + a \times T + b \times T^2$, where $P_0$ is independent on the temperature; and $P_{leakage}$ is modeled as an exponential function of temperature, such as $c \times e^{kT}$. However, it is understood that the analysis can be performed with any computational model for the temperature dependency in general.

In the silicon chip, the power dissipation causes the elevated temperature. The elevated temperature then in turn creates more power dissipation due to increased leakage and switching power. The elevated temperature also causes larger temperature gradient, which speeds up the heat dissipation. Thus, at a given point on the chip there exists a local equilibrium temperature at which the circuit operates with an elevated steady state temperature.

When the integrated circuit devices continue to reduce the feature size, such as scaling into deep submicron technologies, the leakage power becomes a significant part of the total power dissipation for advanced process technologies. For example, when the process technologies advance to the feature size in the order of 90 nm, 65 nm, or smaller, the leakage power becomes a dominant part of the total power dissipation. Minimizing the power dissipation due to leakage current can significantly reduce the total power usage.

One embodiment of the present invention uses the result of the thermal analysis to optimize the circuit design under various design constrains. For example, synthesis transformations are automatically performed to improve a design goal, which may be a combination of area usage, clock frequency, power usage, etc. For example, power usage or leakage power can be minimized for a specified clock frequency and power supply voltage. Similarly, the clock frequency or other timing parameters can be improved with least increase in power usage.

In one aspect, the optimization of a circuit design includes the minimization of power usage, such as the cell switching and leakage components of the total power dissipation, without reducing the clock frequency or the power supply voltage and with minimal additional area penalty.

In another aspect, the optimization of a circuit design includes the timing optimization (e.g., to reduce the clock frequency) using the temperature distribution information without significant penalty in power usage.

In one embodiment of the present invention, a synthesized and placed netlist is optimized for a target frequency and a specified supply voltage. For example, the netlist can be a technology dependent netlist. The information regarding the temperature dependent of power dissipation for the elements of the circuit, such as the standard cells and custom blocks, is used for the thermal model. The optimization includes improving the timing to meet the target frequency and/or reducing the power dissipation of the circuit.

In one embodiment of the present invention, a power minimization process includes: determining self-consistently the local power dissipation and the local temperature across the chip; performing optimizations on the design by placement changes or netlist changes; re-computing the temperature and power to assure that the optimizations is based on the self-consistent local power dissipation and local temperature.

For example, components whose power dissipation is highly sensitive to the local temperature can be moved from elevated temperature areas to low temperature areas. Further, low power dissipation implementations can be used to replace high power dissipation implementations in areas of elevated temperature.

In general, a logic function can be implemented in different ways and using different cells, which provide the trade-off between the power dissipation and other design performances. The use of low power dissipation implementations typically has negative impact on other design parameters. For example, standard cells with high transistor threshold values have low leakage power but reduced timing performance. A low power dissipation implementation of a logic function can take a larger area and/or longer delay than a high power dissipation implementation of the same logic function.

In one embodiment of the present invention, the blocks in the high temperature regions are transformed to trade certain performance for reduced power dissipation, especially for highly temperature dependent components. The blocks in the low temperature regions can then be transformed to gain back the corresponding performance to satisfy the design constraints, such as timing, area usage, etc.

If the design transformation perturbs significantly the thermal condition, such as the power dissipation or the temperature distribution, the self-consistent local power dissipation and the local temperature across the chip are recomputed. The iterations of determining self-consistent thermal solutions and performing optimizations can be repeated until a desired design goal is achieved (or when no significant improvement is achieved).

In one embodiment of the present invention, the temperature distribution based on the power dissipation of the elements of the circuit in design is determined from the thermal model of the IC chip. In one implementation, the thermal model of an IC chip is in the form of the following Laplace's equation:

$$\nabla(K(x,y,z)\nabla T) = -P(x,y,z,T)$$

where P(x, y, z, T) includes the contribution from the net switching power ($P_{net}$), the cell switching power ($P_{switching}$) and the leakage power ($P_{leakage}$). The power dissipation at the cell instances can be smoothly interpolated over the IC chip. K is the thermal conductivity at a given location and is based on the material present at the location. For example, in the silicon region the thermal conductivity of silicon is used; and in the dielectric above the silicon the corresponding thermal conductivity for the dielectric material is used.

In one implementation, the power dissipation sources are assumed to be in the plane of the silicon because the transistors that dissipate most of the power are at there. However, when more detailed design information is available (e.g., the metal layer routing information), the locations of the power dissipation sources can be modeled more precisely. For example, the net switching powers may be modeled in the planes of the metal layers.

The thermal model includes appropriate boundary conditions, which depends on the packaging used and the assumed working environment, such as the ambient temperature. The thermal model is solved to yield a temperature distribution for the whole chip, which can be used to update the power source of the thermal model.

In one embodiment of the present invention, an initial temperature distribution $T_0$ is assumed for the computation of the power source $P(T_0)$. The power source $P(T_0)$ is then used to determine the temperature distribution $T_1$, which is then further used to obtained the updated power source $P(T_1)$. The iteration continues until the solution converges to a self consistent temperature and power source solution.

In one embodiment of the present invention, when a power source P is determined based on an initial temperature distribution or the temperature solution of the previous iteration, the thermal model is solved using one of many available numerical techniques, such as finite differencing, finite elements, boundary value methods, etc.

The temperature distribution $T_{i+1}$ obtained by solving the Laplace's equation will not in general be the same as the original temperature distribution $T_i$ used to calculate the power distribution. The iteration on the power dissipation calculation and the temperature calculation can be performed until the temperature distribution does not change any further (or the power source does not change any further).

In one embodiment of the present invention, once a self consistent temperature and power dissipation solution is obtained from a thermal analysis, design transformations are preformed to improved the design of the circuit using the thermal solution. For example, transformations can be performed to reduce the leakage power of the circuit.

In one embodiment, the cells that have high leakage current at a high temperature region are selected for transformation to minimize power. The leakage current can have an exponential dependence on the temperature. When the cells with high leakage current are moved to a low temperature region, the leakage current can be reduced significantly.

For example, in one embodiment, placement modification techniques are used to move cells with high leakage or switching power from high temperature areas to lower temperature areas to reduce power usage. For example, in an area with a large temperature gradient, a cell can be relocated from a high temperature region to a low temperature region over a short distance. Such a placement change can reduce the temperature gradient and the power usage without significant impact on timing, area usage, etc.

However, changing placement over a long distance can cause significant changes to the circuit design, which can be computationally intensive in an optimization process. In one embodiment of the present invention, netlist changes are also used to reduce the leakage power without significant changes in placement over a long distance.

In one embodiment, some transformations are performed without moving an element from one temperature zone to another temperature zone. Transformations for netlists in different temperatures can be performed to reduce power usage without violating other design constraints.

For example, the library of standard cells can contain cells with the same functionality but different leakage power, such as multiple threshold voltage transistors. Different standard cells with different transistor threshold voltages may be provided for the implementation of the same functionality of an element of a circuit. Thus, the design transformation can involve selecting the standard cells for reduced power usage while maintaining other design constraints. For example, in a high temperature region low leakage power cells that have a high transistor threshold voltage can be used to replace the high leakage power cells that have a low transistor threshold voltage. If the timing constraint for the chip allows the use of the high-threshold voltage cells, the high-threshold voltage cells can be used in the high temperature area to reduce leakage power.

In general, high-threshold cells are slower so that they are used sparingly to meet the timing constraints. In one embodiment of the present invention, the high-threshold cells are used most effectively through the use of the criterion of applying the high-threshold cells in the high temperature regions.

Low leakage power implementations are typically slower and/or larger than high leakage power implementations. For example, the use of the low leakage power cells with a high transistor threshold voltage in the high temperature region can degrade the timing performance on a critical path.

In one embodiment of the present invention, to compensate the degradation in the timing performance, one or more elements on the low temperature portion of the critical path is also transformed to trade power dissipation for timing performance. For example, the high leakage power, high performance cells can be used in a low temperature region of the critical path to replace the low leakage power, low performance cells on the critical path so that the timing constraint is not violated. When the standard cell library includes multiple versions of cells for the same functionality, the temperature solution can be used to determine the selection of cells along timing critical path for the optimization of power usage and timing.

Since the leakage power depends on the temperature exponentially, the use of high leakage power cells in a low temperature region in exchange for the use of low leakage power cells in a high temperature region to maintain the timing performance can lead to reduction in overall leakage power.

In one embodiment, a synthesis transformation is performed to convert one implementation of a logic block to another without relocating the logic block to a different location. Typically, a logic block can be synthesized into different logic implementations with different characteristics (e.g., leakage power usage, area usage, timing performance, etc.) In one embodiment of the present invention, to reduce the power usage one logic block at a high temperature region is selectively transformed for a low power implementation. To avoid violating other design constraints (e.g., area usage or timing), the low temperature region can be transformed accordingly to trade power (and/or area usage) for performance. Thus, the overall performance of the design is improved.

The use of a low power version reduces the power usage even if the temperature of the location remains the same. Actually, the reduction in the power dissipation can lead to the reduction in local temperature, which can further reduce the power usage.

If the fraction of cells transformed is small, the overall temperature distribution may not change significantly by the changes and can still be used for the optimization.

Figure 4:
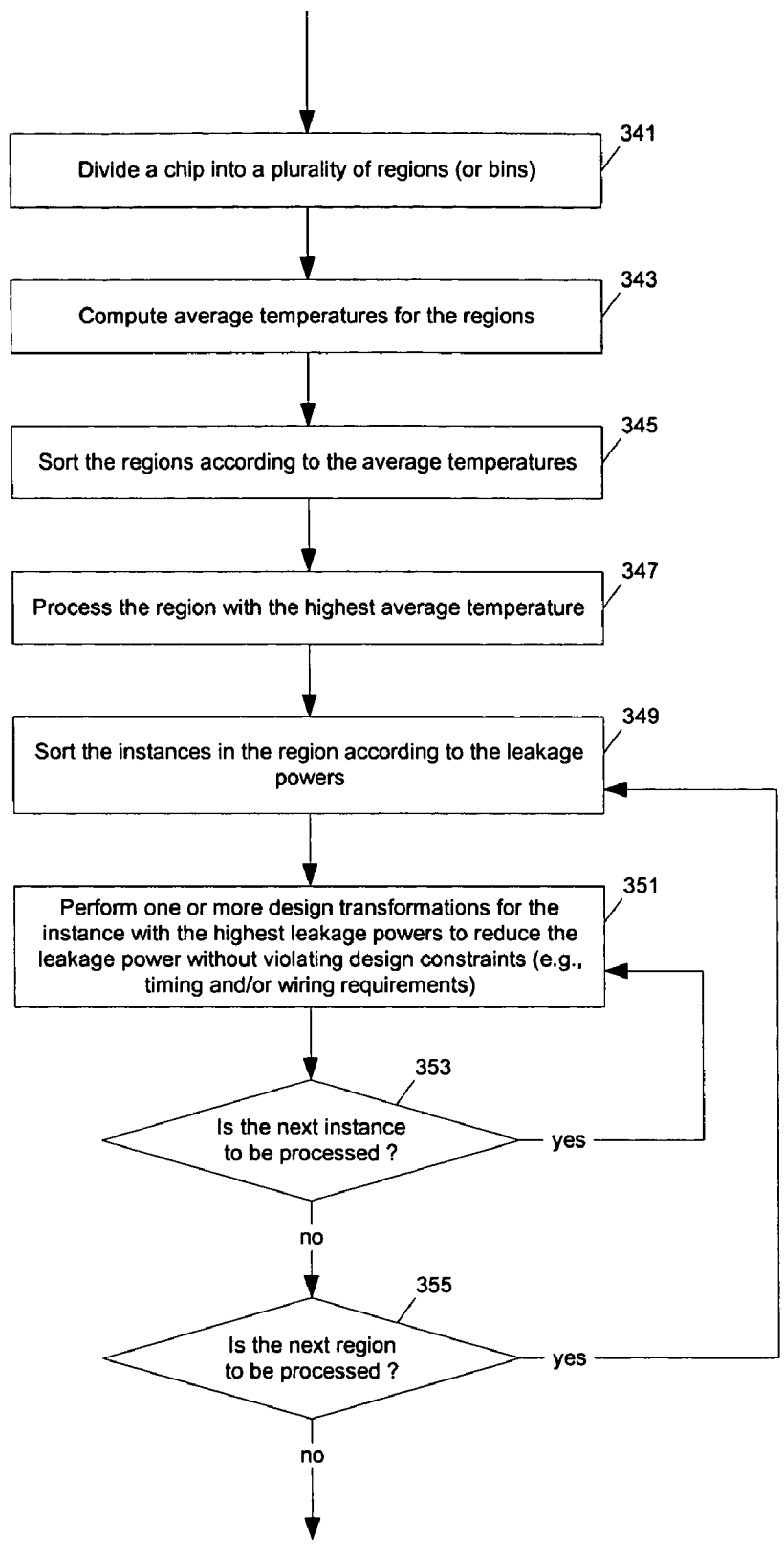
FIG. 4 illustrates a detailed example of optimizing a circuit design according to one embodiment of the present invention.

FIG. 4 illustrates a detailed example of optimizing a circuit design according to one embodiment of the present invention. Operation 341 divides a chip into a plurality of regions (or bins). Operation 343 computes average temperatures for the regions. Operation 345 sorts the regions according to the average temperatures. Operation 347 processes the region with the highest average temperature.

Operation 349 sorts the instances in the region according to the leakage powers. Alternatively, the instances can be sorted according to the sensitivity of leakage power to temperature (e.g., d $P_{leakage}$/d T) or a combination of leakage power and sensitivity of leakage power to temperature. Operation 351 performs one or more design transformations for the instance with the highest leakage powers to reduce the leakage power without violating design constraints (e.g., timing and/or wiring requirements). For example, if a placement tool uses a force directed algorithm to place the instances to minimize congestion, then the temperature can be used in an analogous manner to the local utilization in the cost function of the force directed placer to produce a more even temperature distribution and lower the total power as well. The sensitivity would be used in the selection criteria of the force directed placer to identify which instances to move preferentially. If operation 353 determines to process the next instance, operation 351 is performed to further transform the next highest leakage power cell.

In one embodiment, the process of operations 351 and 353 repeats until the moved instances in the hottest region causes the temperature in the block is reduced or no further changes can be made due to timing or wiring requirements. If operation 355 determines to process the next region, operations 349-353 are repeated for the next highest temperature region. In one embodiment, the process of operations 349-355 repeats for regions until the power usage meets the specification or the top half of the sorted bins have been analyzed or no significant improvement is achieved.

In one embodiment, the power dissipation in the transformed regions is evaluated to determine if the temperature solution needs to be updated. If the temperature solution is updated, operations 341-355 can be repeated.

In one embodiment, the cells selected from the high temperature regions are moved to the lowest temperature region among target regions where if the cells are moved to the timing and wiring requirements are still satisfied.

Figure 5:
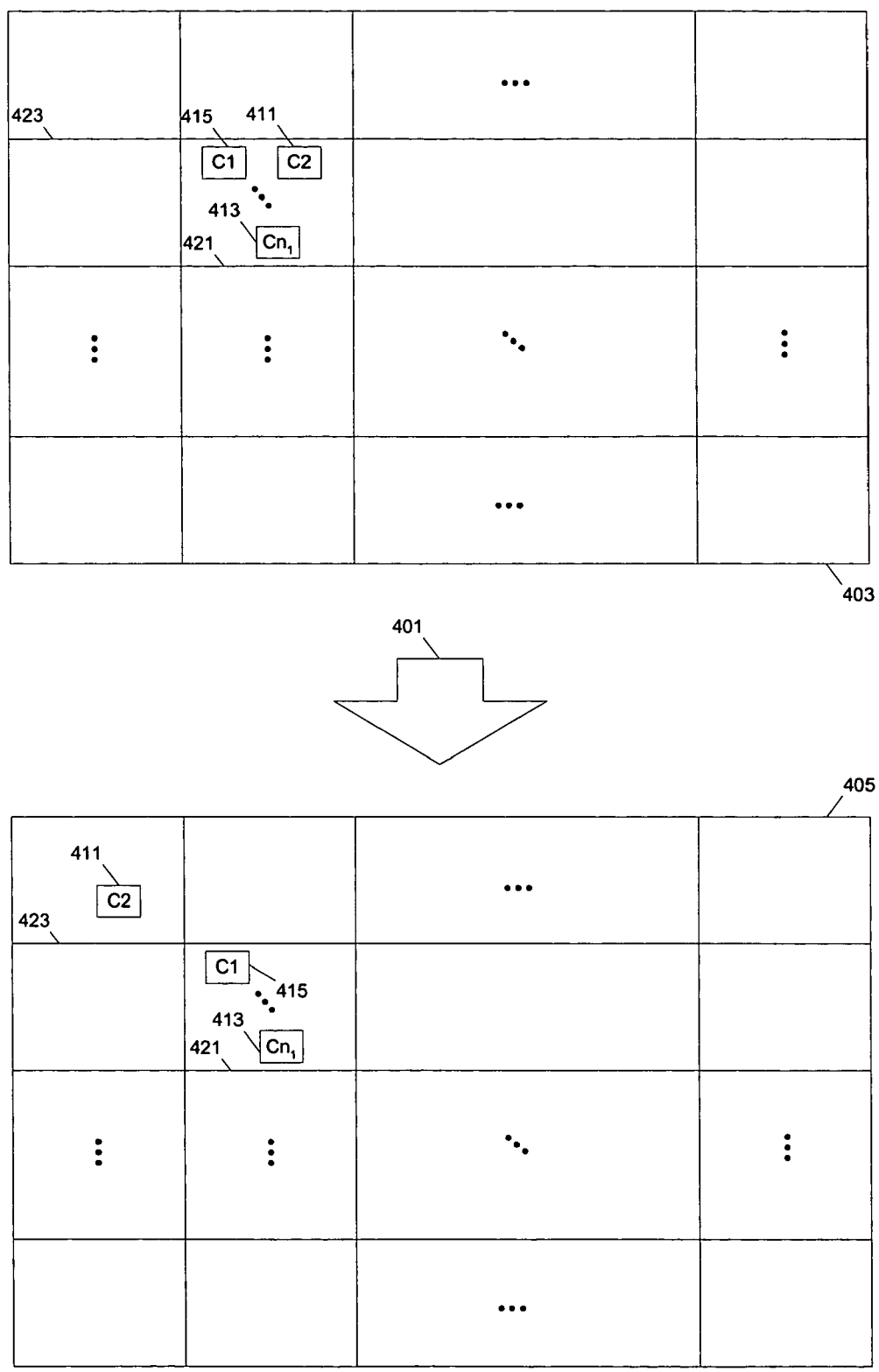
FIG. 5 illustrates one example transformation to optimize a circuit design according to one embodiment of the present invention.

FIG. 5 illustrates one example transformation to optimize a circuit design according to one embodiment of the present invention. In FIG. 5, the chip according to a design 403 is divided into regions, such as region 421, region 423, etc. FIG. 5 illustrates a way to divide the chip into regions using a regular mesh. In general, the regions can be irregular in shapes and arrangement. For example, the regions can be divided according to the contour lines of the temperature distributions. The regions can be divided so that the temperature within the regions is substantially uniform.

In one embodiment, the regions are sorted according to their average temperatures. The regions are processed in the order of their average temperature, starting from high temperature regions to low temperature regions. The cell instances in a region are sorted according to the temperature dependent portion of the power or the leakage power. For example, in region 421, cell instances 411, 413, 415, etc., are processed according to the leakage power of the cells. The cell instances with high leakage power are processed first.

For example, if the cell instance 411 has the highest leakage power in the region 421, the cell instance 411 may be moved to a lower temperature region. The regions that have temperatures lower than the region 421 are the candidate regions of the move.

Typically, a subset of the candidate regions are allowable, since moving the cell instance 411 to a remote region may cause too much delay in timing to satisfy the timing constraint or cause area constraint violation in a congested area or cause violation in routing rules. The availability of routing resources can also limit the target regions the cell instance can be moved into. Thus, the set of allowable target regions can be determined so that the cell instance can be moved into one of the allowable target regions without violating a design constraint.

From the set of allowable target regions, a region with the lowest temperate can be select as the target region. For example, when the region 423 is selected as the target region, the design transformation 401 moves the cell instance 411 from the source region 421 into the target region 423 to generate the new design 405.

Figure 6:
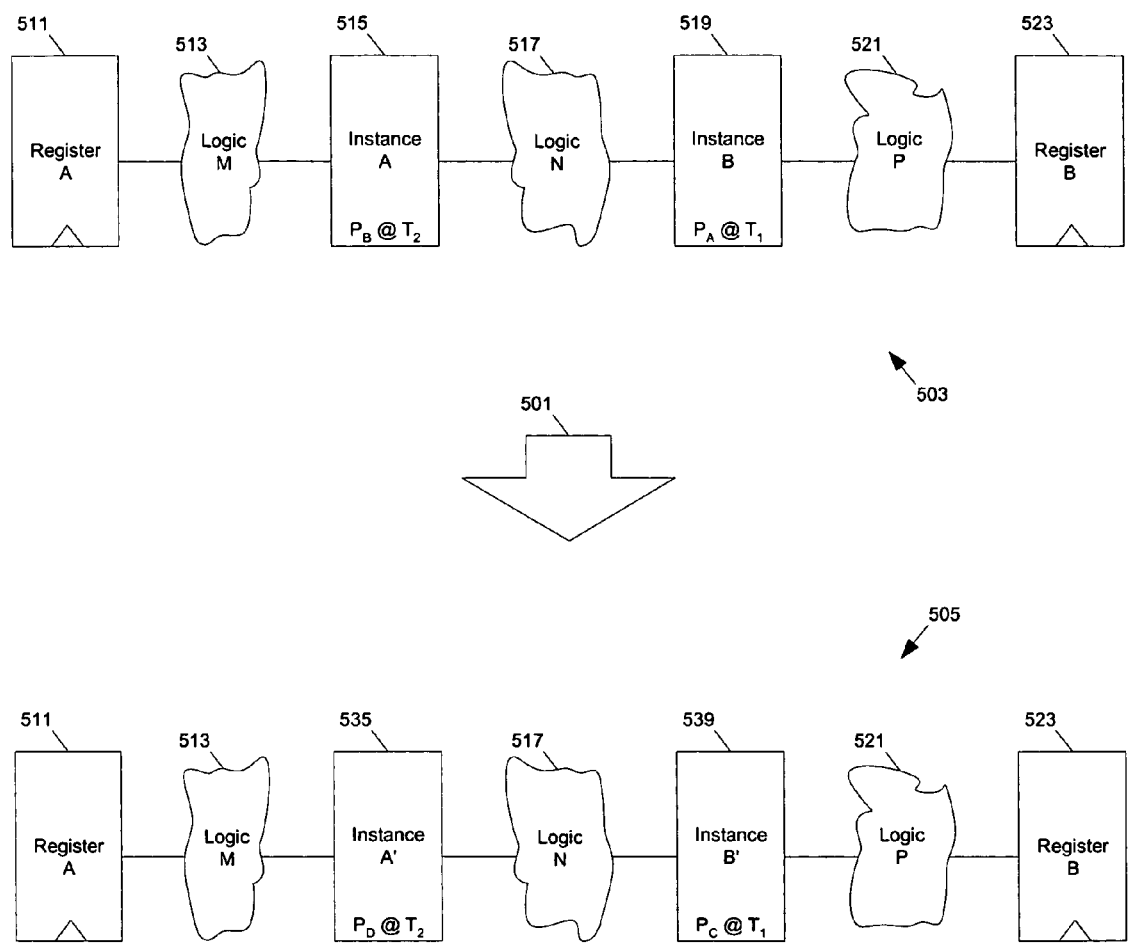
FIG. 6 illustrates another example transformation to optimize a circuit design according to one embodiment of the present invention.

FIG. 6 illustrates another example transformation to optimize a circuit design according to one embodiment of the present invention. In FIG. 6, a path 503 includes a high leakage cell instance 519 in a high temperate region and a low leakage cell instance 515 in a low temperature region. The path is between registers 511 and 523, passing through logic 513, cell instance 515, logic 517, cell instance 519, and logic 521.

When the path 503 is not timing critical, the high leakage cell instance 519 having a leakage power $P_A$ at temperature $T_1$ can be replaced with a low leakage cell instance such as cell instance 539 which perform the same function. For example, the cell instance 539 has a higher transistor threshold voltage than the cell instance 519 so that the cell instance 539 has a reduced leakage power (e.g., $P_C$<$P_A$ at temperature $T_1$) even if the temperature of the cell instance remains the same (e.g., $T_1$). However, the use of the high threshold instance degrades the timing performance and reduces the slack of the path. If the timing requirement is still satisfied, such an design transformation is acceptable.

When the path is timing critical (or sub-critical), the use of the high threshold instance can cause timing violation. In one embodiment of the present invention, the cell instance 515 having a leakage power $P_B$ in the low temperature region of temperature $T_2$ is also transformed to improve the timing performance and avoid timing violation. For example, a low threshold instance 535 with a leakage power $P_D$>$P_C$ at temperature $T_2$ is used to replace the high threshold instance 515. Thus, when both the cell instances in the high temperature region and in the low temperature region are transformed to convert path 503 into path 505, the timing constraint remains satisfied.

Note that cell instances 519 and 535 may not perform the same function and may not have the same resistor threshold voltage.

Although the use of low threshold instance in the low temperature region increases the leakage power, the overall transformation (501) for both cell instances 515 and 519 reduces the leakage power. Since the leakage power is highly sensitive to the temperature, the leakage power reduction in the high temperature region out weights the increase in the low temperature region.

Using standard cell instances with different transistor threshold voltages is one example of making netlist changes without significantly altering the placement solution. Other examples include transform a subset of netlist into a functionally equivalent netlist that has different tradeoff in leakage power, timing, area usages and others.

Figure 8:
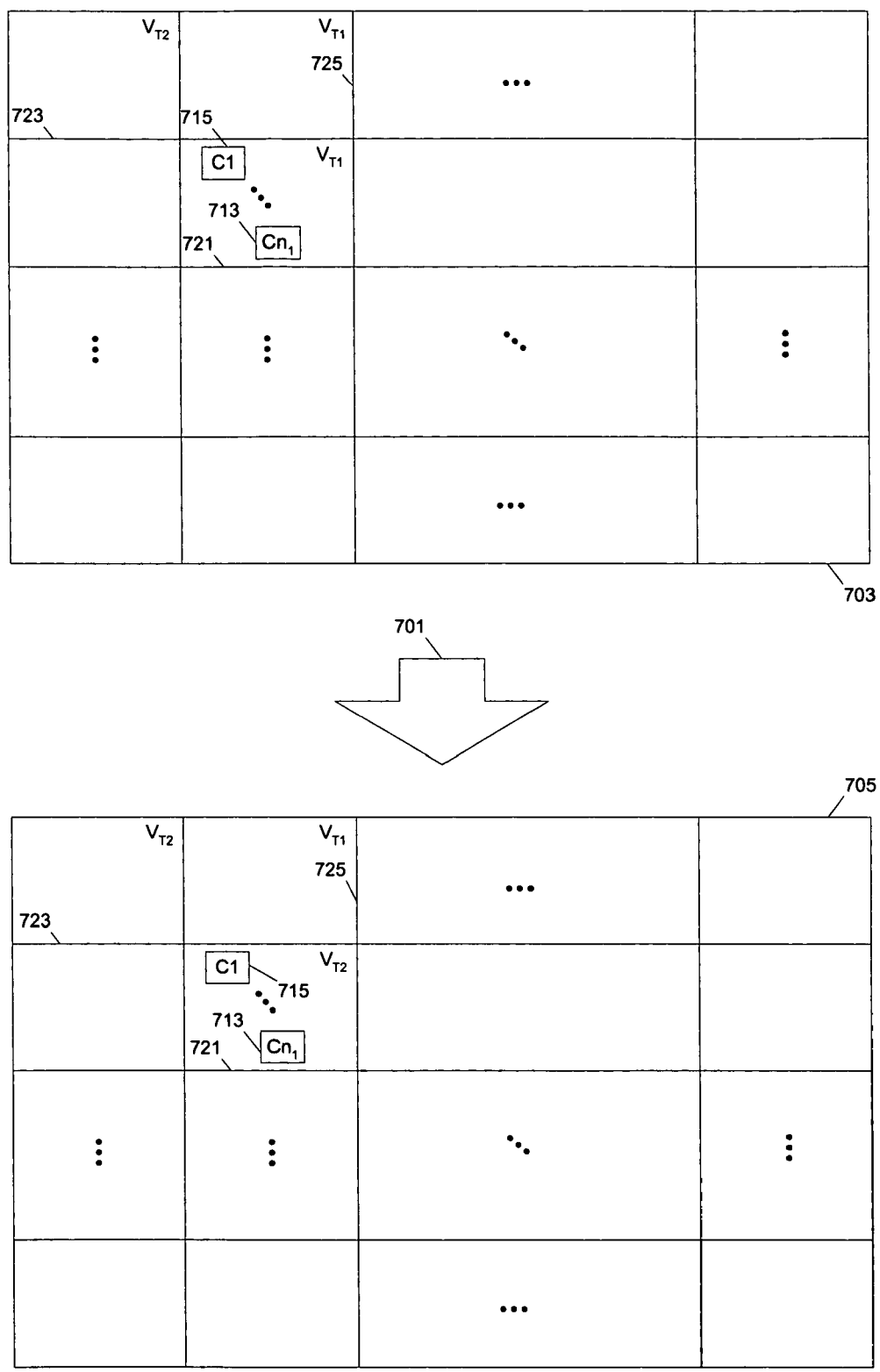
FIG. 8 illustrates a detailed flow of synthesis transformations to optimize a circuit design according to one embodiment of the present invention.

FIG. 8 illustrates a further synthesis transformation to optimize a circuit design according to one embodiment of the present invention. In one embodiment of the present invention, a chip has a number of blocks. Thus, the cells in one block have the same transistor threshold voltage. For example, in block 721, cells 713, 715, etc., have the same (or almost the same) threshold ($V_{T1}$). The cells in block 723 can have a different threshold ($V_{T2}$).

If the threshold is high, the block is a high threshold block, in which the cells have low leakage power and low timing performance (high delay). If the threshold is low, the block is a low threshold block, in which the cells have high leakage power and high timing performance (low delay). For example, on one implementation of an FPGA chip, the blocks of cells can be specified as a high threshold block, a low threshold block, a medium threshold block, etc. The threshold may be hardwired or adjustable during the computation.

In one embodiment of the present invention, a block of cells can be switched from one threshold value to another through a design transformation to reduce the power usage. High threshold blocks are used to reduce the power usage and low threshold blocks are used to improve the timing performance. In one embodiment of the present invention, a distribution of various threshold blocks is determined through optimizing the power usage while satisfying the timing constraint.

For example, after the timing critical paths and the instances on the timing critical paths are identified, the timing non-critical instances in a low threshold block can be moved into a nearby high threshold block; and timing critical instances can be moved from a high threshold block to a nearby low threshold block.

When a block mostly contains timing non-critical instances, the block can be switched from a low threshold to a high threshold. For example, in FIG. 7, the transformation 701 converts the threshold for the block 721 from $V_{T1}$ in the design 703 to $V_{T2}$ to generated design 705.

Switch a block from a low threshold to a high threshold may cause some of the paths in or passing the block to become critical (or to violate timing constraint). Thus, timing critical instances can be identified and moved to a nearby block (e.g., block 725) to satisfy the timing constraint.

In one embodiment of the present invention, the transformation of a block from one threshold to another is at least partially based on the average temperature of the block. For example, a block with a high temperature is a candidate for transforming into a high threshold block to reduce the power usage, especially the leakage power. A nearby low temperature block may be transformed into a low threshold block, if the nearby low temperature is on a number of the timing critical path pass these two blocks. Such a trade-off transformation on a block basis is similar to the trade-off transformation on an instance basis illustrated in FIG. 6.

In one embodiment of the present invention, different design transformations are combined in the optimizing power usage using the temperature solution.

Figure 7:
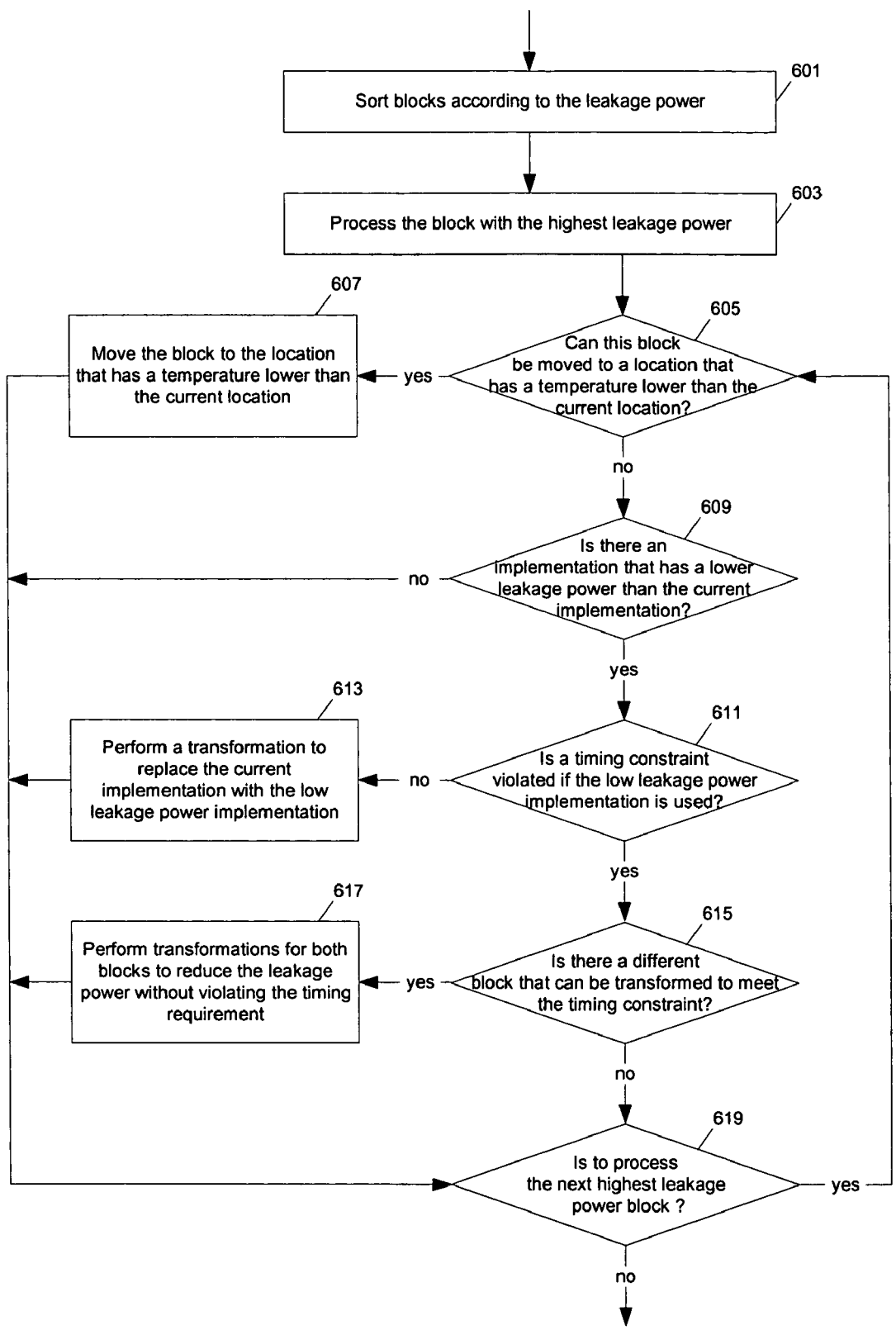
FIG. 7 illustrates a further synthesis transformation to optimize a circuit design according to one embodiment of the present invention.

FIG. 7 illustrates a detailed flow of synthesis transformations to optimize a circuit design according to one embodiment of the present invention. Operation 601 sorts blocks according to the leakage power. Operation 603 processes the block with the highest leakage power.

If operation 605 determines this block can be moved to a location that has a temperature lower than the current location, operation 607 moves the block to the location that has a temperature lower than the current location.

If operation 609 determines there is an implementation that has a lower leakage power than the current implementation, operation 611 determines whether a timing constraint is violated if the low leakage power implementation is used. If the use of the low leakage power implementation will not cause timing violation, operation 613 performs a transformation to replace the current implementation with the low leakage power implementation; otherwise, operation 615 determines whether there is a different block that can be transformed to meet the timing constraint if the low leakage power implementation is used.

If a different block can be transformed to meet the timing constraint when the low power implementation is used, operation 617 performs transformations for both blocks to reduce the leakage power without violating the timing requirement.

If the block cannot be transformed without violating a design constraint, operation 619 determines whether to process the next highest leakage power block.

Since the power dissipation estimation is based on the temperature distribution, a small perturbation of the temperature distribution does not affect the correct selection for elements for transformation. Thus, operations 605-609 can be repeated until the temperature distribution needs to be updated. The temperature distribution can be re-evaluated using the technique described above after a sufficient number of changes have been made (or if the power dissipation based on the current temperature distribution is changed significantly).

One embodiment of the present invention includes timing optimization using the temperature distribution of the design.

In one embodiment of the present invention, a leakage sensitivity map is constructed based on the temperature distribution. The leakage sensitivity map shows the sensitivity of leakage power to the temperature change (e.g., d $P_{leakage}$/d T) for various locations on the chip. The leakage sensitivity map can then be used to identify the instances or blocks for transformations to reduce leakage power. For example, the instances with large sensitivity of leakage power to the temperature change can be selected for transformation (e.g., placement changes, implementation changes, threshold changes, etc.) before the instances with small sensitivity of leakage power to the temperature change are selected for transformation. Thus, optimizations can be performed for the cells or blocks with the greatest sensitivity. Instances with low temperature sensitivity could then be used to preferentially improve timing. In one embodiment of the present invention, the sensitivity of leakage power to the temperature change is also included in the objective function (e.g., during placement or synthesis transformation) for the optimization of a design goal. Further, the sensitivity of leakage power to allowable transformation can be computed to select the cells (and blocks) and transformations. For example, to select a transformation, the changes in leakage power for a number of candidate transformations on a number of candidate cells can be evaluated. The candidate transformation on the candidate cell with most reduction in leakage power can be selected for the transformation. Such a selection process can be repeated to perform transformations that are most effective in the reduction of leakage power.

For a type of cells the delay from an input to an output and the transition time at the output of the cell type can be characterized as a function of the temperature. Such a function of the temperature can be obtained for the whole library of standard cells and the custom blocks or macros (e.g., through curve fitting measurements for different standard cells). One embodiment of the present invention performs timing optimization using the temperature distribution and the information on the temperature dependent portion of the delay.

In one embodiment of the present invention, after obtaining the self-consistent temperature distribution and power dissipation, a static timing analysis (STA) is performed to identify the critical paths in the design.

Using the results of STA, the top N critical paths and the cell instances that the critical paths traverses can be identified. Because the cell delay and transition times increase with temperature, the working temperature of the instances can be reduced by making netlist and/or placement changes (e.g., moving high delay elements from high temperature regions to low temperature regions) in a way similar to the power minimization. Further, low delay implementations, which may occupy a larger area, can also be used. For example, low transistor threshold cells can be used in low temperature regions to improve timing with least increase in power usage.

According to one embodiment of the present invention, one technique to improve the timing involves placement changes. For example, cells with excessive cell delay and transition times due to elevated temperatures can be moved from high temperature regions to low temperature regions.

Placement changes over a large distance may involve significant change to the circuit design, which may not be desirable at a late stage of design (e.g., after the placement and routine solution is obtained). In one embodiment of the present invention, techniques to improve the timing involve netlist changes.

For example, a cell at a high temperature region may be on a number of paths, among which one path (or a portion of the paths) is timing critical. The cell can be replicated so that the replicated cell can be placed in a low temperature region for the critical path. Such a technique can be used to reduce the impact of placing a cell into a low temperature region.

Further, for example, the temperature distribution can be used to select cells on the low temperature regions of the critical paths so that the selected cells can be replaced with standard cells or custom cells that have low delays (e.g., low transistor threshold voltage cells).

In one embodiment of the present invention, a delay sensitivity map is constructed based on the temperature distribution. The delay sensitivity map shows the sensitivity of delay to the temperature change for various locations on the chip. The delay sensitivity map can then be to identify the instances or blocks for transformations to reduce delay. For example, the instances with large sensitivity of delay to the temperature change can be selected for transformation (e.g., placement changes, implementation changes, threshold changes, etc.) before the instances with small sensitivity of delay to the temperature change are selected for transformation. Thus, optimizations can be performed for the cells or blocks with the greatest sensitivity. In one embodiment of the present invention, the sensitivity of delay to the temperature change is also included in the objective function (e.g., during placement or synthesis transformation) for the optimization of a design goal. Further, the sensitivity of delay to allowable transformation can be computed to select the cells (and blocks) and transformations. For example, to select a transformation, the changes in delay for a number of candidate transformations on a number of candidate cells can be evaluated. The candidate transformation on the candidate cell with most reduction in delay can be selected for the transformation. Such a selection process can be repeated to perform transformations that are most effective in the reduction of delay.

Further, in one embodiment, both the leakage sensitivity and delay sensitivity are used for the optimization of combined goal of reducing leakage and delay. For example, sensitivities of leakage power and delay to temperature can be combined to generate a sensitivity indicator, which can be sorted for cells (and blocks) to select the a cell (or block) for transformation. Further, to select a transformation, the changes in delay and leakage power for a number of candidate transformations on a number of candidate cells can be evaluated. A goal indicator which is a function of the changes in delay and leakage power can be evaluated. The candidate transformation on the candidate cell with best goal indicator can be selected for the transformation.

In general, the self consistent temperature solution and the power dissipation solution can be used to optimize a design goal involving the power dissipation, the timing constraints and other design parameters (e.g., area usage). For example, the design goal can be the minimization of total power usage, or total leakage power, under one or more design constraints, such as timing constraints (e.g., minimum clock period), area usage, routing resource, etc. Further, a design goal can be designed to balance the conflicting resource requirements, such as power usage (or leakage power) and timing performance. For example, the design goal can be the weighted sum of the power usage (or leakage power) and the minimum clock period. The design goal can be optimized for the possible changes of different implementations of cells (e.g., standard cells of different transistor threshold voltages) and different implementation of logic functions. Placement variations can also be used as a variable for the optimization process.

In one embodiment of the present invention, if most of the critical paths are in one logical module, the logic module is constrained to be in a region of lower temperature.

After a sufficient number of changes are made to the design of the circuit, the thermal analysis can be performed again to assure that the thermal map is consistent with the design and to evaluate the improvement in the timing of the design after the optimization.

Many of the methods of the present invention may be performed with a digital processing system, such as a conventional, general-purpose computer system. Special purpose computers, which are designed or programmed to perform only one function, may also be used.

Figure 9:
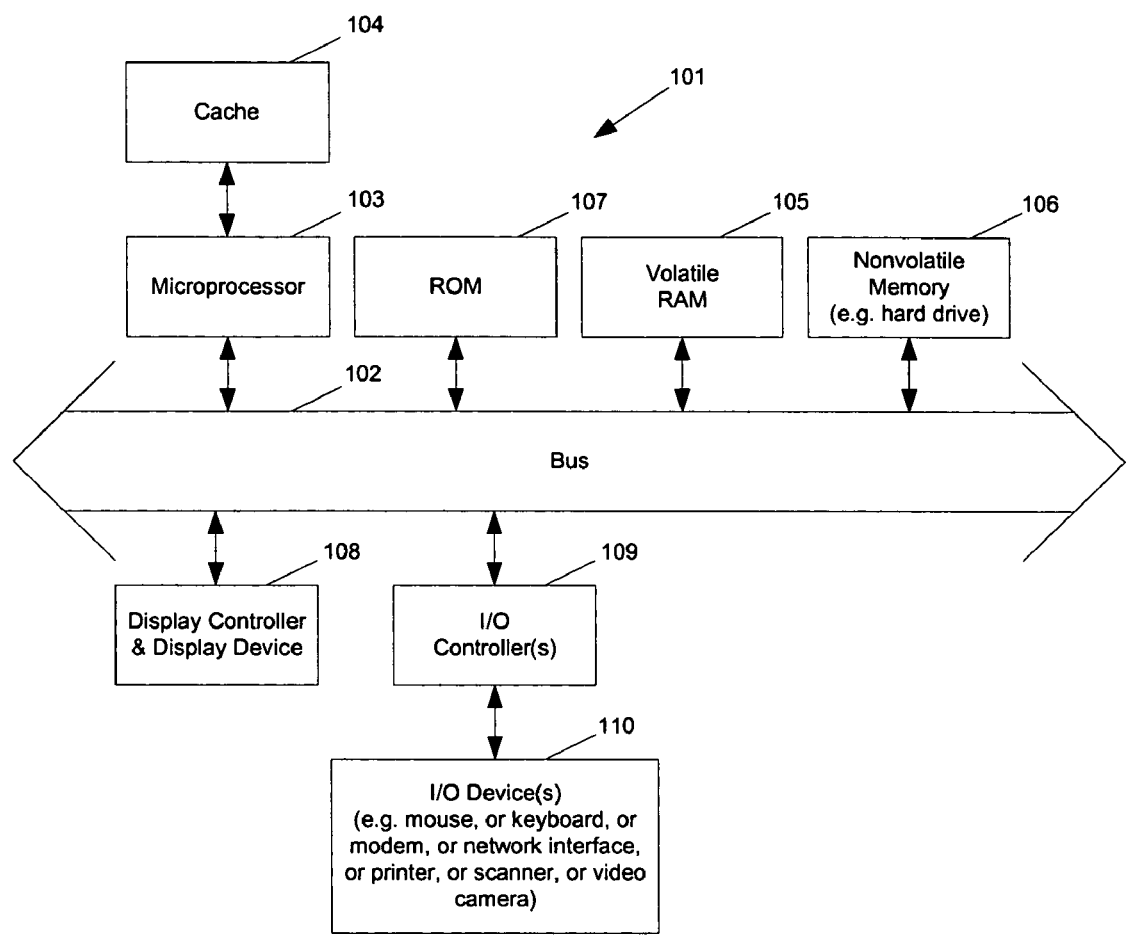
FIG. 9 shows a block diagram example of a data processing system which may be used with the present invention.

FIG. 9 shows one example of a typical computer system which may be used with the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 9 may, for example, be a Sun workstation, or a personal computer (PC) running a Windows operating system, or an Apple Macintosh computer.

As shown in FIG. 9, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 9. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 9 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art.

In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 9. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable medium containing executable computer program instructions which when executed by a digital processing system cause said system to perform a method for circuit design, the method comprising:
   determining, by performing a thermal analysis for a first design of a circuit, a first temperature solution and a first power dissipation solution, the first power dissipation solution and the first temperature solution being interdependent; and
   transforming the first design of the circuit into a second design of the circuit using the first temperature solution to reduce power dissipation of the circuit under one or more design constraints.

2. The medium of claim 1, wherein the first temperature solution is computed to represent a steady state thermal dynamic balance between the first design of the circuit and a surround environment of the circuit.

3. The medium of claim 2, wherein the first power dissipation solution includes temperature dependent power dissipation of elements of the first design.

4. The medium of claim 3, wherein the temperature dependent power dissipation comprises leakage power of elements of the first design.

5. The medium of claim 4, wherein said transforming comprises:
   moving an element of the first design of the circuit from a first location which has a first temperature according to the first temperature solution to a second location which has a second temperature according to the first temperature solution;
   wherein the first temperature is higher than the second temperature.

6. The medium of claim 5, wherein the first design comprises a placement solution.

7. The medium of claim 6, wherein the first design further comprises a routing solution.

8. The medium of claim 7, wherein said transforming reduces leakage power of the circuit under one or more design constraints.

9. The medium of claim 8, wherein the one or more design constraints comprises a timing constraint.

10. The medium of claim 1, wherein said transforming comprises:
   replacing a first element of the first design of the circuit with a second element of the second design of the circuit;
   wherein the first and second elements are functionally equivalent; and
   wherein the second element has power dissipation lower than the first element at a same temperature.

11. The medium of claim 10, wherein the first element has a first transistor threshold voltage; the second element has a second transistor threshold voltage; and the first transistor threshold voltage is lower than the second transistor threshold voltage.

12. The medium of claim 10, wherein the second element is smaller than the first element.

13. The medium of claim 10, wherein said transforming further comprises:
   replacing a third element of the first design of the circuit with a fourth element of the second design of the circuit to meet a timing requirement on a path passing through the first and third elements;

wherein the third and fourth elements are functionally equivalent; and wherein the fourth element has power dissipation higher than the third element at a same temperature.

14. The medium of claim 13, wherein the third element has a third transistor threshold voltage; the fourth element has a fourth transistor threshold voltage; and the fourth transistor threshold voltage is lower than the third transistor threshold voltage.

15. The medium of claim 13, wherein the method further comprises:

selecting the first and third elements on a signal path of the first design of the circuit;

wherein the first element is at a first location which has a first temperature according to the first temperature solution;

wherein the third element is at a second location which has a second temperature according to the first temperature solution; and wherein the first temperature is higher than the second temperature.

16. The medium of claim 1, wherein the method further comprises:

determining a timing critical path; and selecting a first element of the timing critical path based on at least the first temperature solution;

wherein said transforming comprises replacing the first element with a second element to improve timing on the timing critical path.

17. The medium of claim 16, wherein the first element is selected from a low temperature portion of the timing critical path.

18. The medium of claim 16, wherein the second element has a transistor threshold voltage lower than the first element.

19. The medium of claim 1, further comprising:

determining sensitivities of leakage to temperature change at a plurality of locations in the circuit; and based on the sensitivities of leakage to temperature change, determining a transformation from the first design of the circuit to the second design of the circuit.

20. A machine readable medium containing executable computer program instructions which when executed by a digital processing system cause said system to perform a method for circuit design, the method comprising:

determining, by performing a thermal analysis, a temperature solution and a power dissipation solution for a first design of a circuit, the power dissipation solution and the temperature solution are interdependent, the power dissipation solution and the temperature solution consistent with each other, and transforming the first design of the circuit into a second design of the circuit using the temperature solution to improve performance of first design of the circuit under one or more design constraints.

21. The medium of claim 20, wherein the method further comprises:

selecting an element of the first design from a location with an elevated temperature according to the temperature solution;

wherein the first design is transformed into a second design through replacing a first implementation of the element with a second implementation to reduce leakage power.

22. The medium of claim 21, wherein the first implementation has a transistor threshold voltage lower than the second implementation.

23. The medium of claim 21, wherein the second implementation has a transistor threshold voltage lower than the first implementation.

24. The medium of claim 20, wherein the method further comprises:

selecting an element of the first design from a location with a low temperature according to the temperature solution;

wherein the first design is transformed into a second design through replacing a first implementation of the element with a second implementation to improve timing on a path while limiting an increase in leakage power.

25. The medium of claim 20, further comprising:

determining sensitivities of leakage to temperature change at a plurality of locations in the circuit;

determining sensitivities of delay to temperature change at a plurality of locations in the circuit; and based on the sensitivities of leakage to temperature change and the sensitivities of delay to temperature change, determining a transformation from the first design of the circuit to the second design of the circuit.

26. The medium of claim 20, further comprising:

determining sensitivities of delay to temperature change at a plurality of locations in the circuit; and based on the sensitivities of delay to temperature change, determining the timing optimization.

27. A data processing system for circuit design, the data processing system comprising:

means for determining by performing a thermal analysis for a first design of a circuit a first temperature solution and a first power dissipation solution, the first power dissipation solution and the first temperature solution being interdependent; and means for transforming the first design of the circuit into a second design of the circuit using the first temperature solution to reduce power dissipation of the circuit under a timing constraint.

28. The data processing system of claim 27, wherein said means for transforming comprises:

means for replacing a first element of the first design of the circuit with a second element of the second design of the circuit;

wherein the first and second elements are functionally equivalent; and wherein the second element has power dissipation lower than the first element at a same temperature.

29. The data processing system of claim 28, wherein the first element has a first transistor threshold voltage; the second element has a second transistor threshold voltage; and the first transistor threshold voltage is lower than the second transistor threshold voltage.

30. The data processing system of claim 28, wherein the second element is smaller than the first element.

31. The data processing system of claim 28, wherein said means for transforming further comprises:

means for replacing a third element of the first design of the circuit with a fourth element of the second design of the circuit to meet a timing requirement on a path passing through the first and third elements;

wherein the third and fourth elements are functionally equivalent; and wherein the fourth element has power dissipation higher than the third element at a same temperature.

32. The data processing system of claim 31, wherein the third element has a third transistor threshold voltage; the fourth element has a fourth transistor threshold voltage; and the fourth transistor threshold voltage is lower than the third transistor threshold voltage.

33. The data processing system of claim 27, further comprising:
- means for determining a timing critical path; and
- means for selecting a first element from a first portion of the timing critical path based on at least the first temperature solution, the first portion of the timing critical path having a temperature lower than a second portion of the timing critical path according to the first temperature solution;
- wherein said means for transforming comprises means for replacing the first element with a second element to improve timing on the liming critical path;
- wherein the second element has a transistor threshold voltage lower than the first element.

* * * * *